Oct. 6, 1959   C. L. FARRAND ET AL   2,907,246
VERTICAL LEVELING MIRROR
Filed Oct. 27, 1955   2 Sheets-Sheet 1
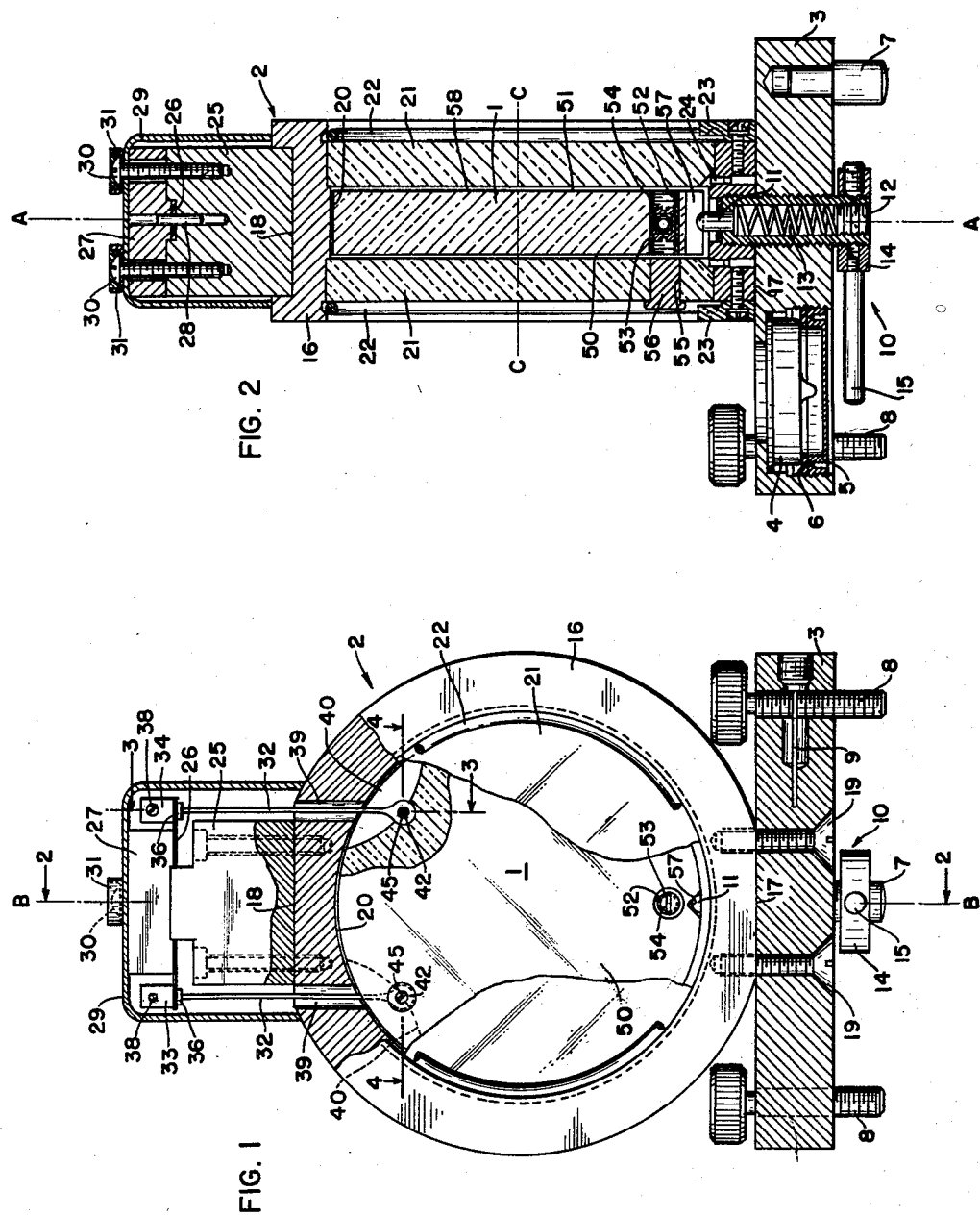
INVENTORS
CLAIR L. FARRAND
HAROLD J. HASBROUCK
BY
ATTORNEYS

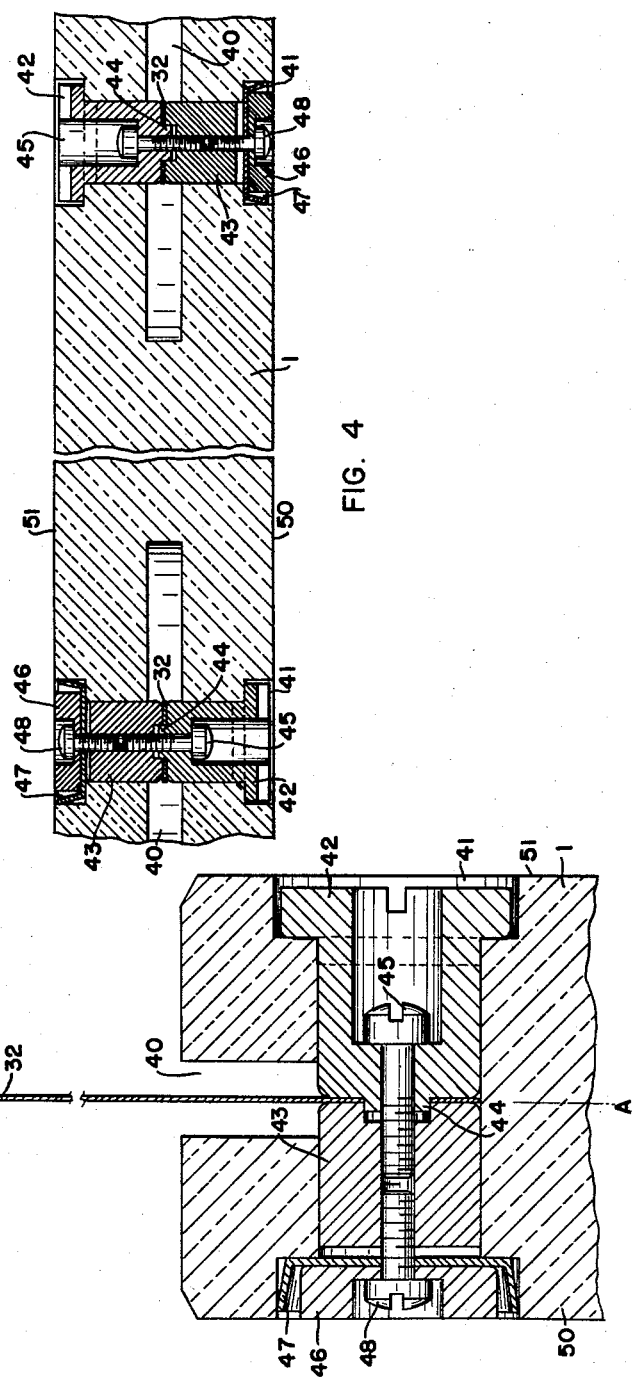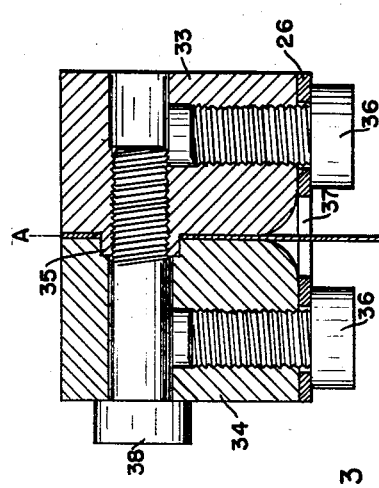

United States Patent Office 2,907,246
Patented Oct. 6, 1959

2,907,246

VERTICAL LEVELING MIRROR

Clair L. Farrand, Bronxville, N.Y., and Harold J. Hasbrouck, Teaneck, N.J., assignors to Farrand Optical Co., Inc., New York, N.Y., a corporation of New York Application October 27, 1955, Serial No. 543,122

15 Claims. (Cl. 88—1)

This invention relates to apparatus for checking the level of an optical horizontal line of sight, and more particularly to an accurately and sensitively suspended mirror with a flat light-reflecting surface which defines a vertical plane in the mirror's equilibrium position.

In the production of air frames and the like, large scale fixtures are employed for the proper relative positioning of the elements to be assembled. Increasing use has been made of optical devices to establish with reference to such fixtures lines of sight with respect to which the aircraft elements are positioned. For example, an alignment telescope and target may be used to establish a basic line of sight defining a lengthwise axis in the fixture, while a second telescope and target define a secondary line of sight parallel to the first which serves as an index for the relative rotational positions of the various aircraft elements of the assembly about the first line of sight.

Very often it is necessary to accurately check the horizontal level of a telescopic line of sight. An accurate measurement of this nature can be effected by a vertical leveling mirror comprising a freely suspended mirror with a flat light-reflecting surface which defines a vertical plane in the mirror's equilibrium position. The vertical leveling mirror provides an accurately positioned reference plane for the reflection of the optical line of sight to be checked. Any divergence between incident and reflected optical rays indicates an inaccuracy in the level of the line of sight. Telescopes checked by this means should be provided with autocollimating features for the detection of incident and reflected ray divergence.

Accurate vertical alignment of the mirror's reflecting surface in its equilibrium position requires that the mirror's suspension points be accurately positioned with respect to its center of gravity. Means for insuring accurate vertical suspension should not however interfere with the requirement that the suspending means be very sensitive to small variations of the mirror from its equilibrium position.

An additional consideration in the design of vertical leveling mirrors adapted for use in plants is the provision of means for isolating and damping the suspended mirror from the vibrations that are always present. If the mirror is not so protected, the vibrations will cause shaking or blurring of the reflected image.

The vertical leveling mirror of this invention comprises a mirror suspended from a support by flexure links. The flexure links are attached to the mirror and the support by means of mounts which provide accurate suspension point positioning and yet retain the sensitivity of flexure link suspension. The mirror is also provided with a balance weight whose position with respect to the mirror may be varied thereby providing means for adjusting the position of the mirror's center of gravity with respect to its suspension points.

In addition to providing sensitive suspension the flexure links tend to isolate the mirror from vibrations transmitted through its support. The vertical leveling mirror of this invention is, however, also provided with vibration damping effected by suspending the mirror between a pair of damping plates.

Advantageously the mirror is provided with two flat, light-reflecting and parallel surfaces positioned on opposite sides of the mirror. This arrangement permits the use of a technique to be described hereinafter which insures accurate checking of line of sight level.

The invention will now be described in detail in connection with the accompanying drawings, in which:

Fig. 1 is a front view of the vertical leveling mirror of this invention, parts of which have been cut away for better illustration;

Fig. 2 is a sectional view of the vertical leveling mirror taken along line 2—2 of Fig. 1;

Fig. 3 is a sectional view of the mirror's suspension means taken along line 3—3 of Fig. 1;

Fig. 4 is a sectional view of the mirror's suspension mounting arrangement taken along line 4—4 of Fig. 1.

Referring to Figs. 1 and 2, the vertical leveling mirror basically comprises a mirror 1 suspended in a housing 2 which is mounted onto a base plate 3. The base plate 3 encloses a circular air bubble level 4. The circular level is enclosed and retained within an opening in the base plate by means of level retainer screw 5 and cushion 6. The base plate is supported at three points by means of base pin 7 and adjustable elevation screws 8, used for leveling the base plate and housing. Friction pins 9 apply pressure to the elevation screws to restrain them from moving from a preset elevation position.

To facilitate description in the specification and the appended claims the housing and base plates will be considered to be in their leveled position, unless otherwise indicated, when reference is made to the position of the suspended mirror relative thereto.

Locking bolt 10 is threaded through the base plate into the housing. An internal axial bore in the locking bolt is made smaller in diameter at its upper end to form a shoulder. Flanged locking pin 11 is pressed up against this shoulder by means of screw 12 and compression spring 13. The locking pin projects upward from the bore into the mirror compartment 58 in the housing. The vertical position of locking bolt 10 is varied by means of collar 14 and lever 15.

Housing 2 comprises a lower and upper portion, the lower portion being essentially an annulus 16 having a flattened lower end 17 and upper end 18. The annulus projects perpendicularly from base plate 3 and is attached thereto by means of bolts 19 threaded into flattened end 17. The opening within the annulus is divided into three concentric circular compartments axially perpendicular to the annulus. The inner compartment is smaller than the two outer compartments because of circular extension 20 which projects perpendicularly inward and forms a pair of parallel shoulders. Two flat windows 21 are fitted within the outer compartments against these parallel shoulders to form a disk-shaped mirror compartment having opposing flat and parallel surfaces. The windows are held in place by means of split retainer wires 22 which snap into position in grooves bounding the outer compartments. The ends of the retainer wires are held in place by means of clamps 23. Dowel pins 24 fit into holes in the windows to restrain any tendency on their part to rotate within the outer compartments.

The upper portion of the housing is designed as a support for the flexure links from which the mirror is suspended. Block 25 is bolted onto flattened upper portion 18 of annulus 16. A link support 26 comprising a strip of spring material is placed within a groove on top of block 25 and extends parallel to base plate 3. The link support is restrained at its center by block 25 but has two unrestrained end portions extending beyond the central support. Cap 27 has a male extension which mates with the groove in block 25 and presses against the link support to hold it securely therein. Dowel pin 28 is inserted through cap 27, block 25 and link support 26 to prevent the link support from slipping within the groove. Dust cover 29 is attached to cap 27 by means of bolts 30 which pass through cups 31. With the cover the housing completely encloses the sensitively suspended mirror and protects it from vibration inducing air currents.

Mirror 1 is suspended from link support 26 by means of flexure links 32 attached one to an unrestrained link support end portion. The flexure links are preferably made of very thin shim stock. In this embodiment the flexure links are made of beryllium copper and measure .0005 inch thick in the direction of mirror swing and .020 inch wide. Link support 26 is made of Phosphor bronze and is .010 inch thick. The flexible support provided by the unrestrained portions of the link support protects the sensitive flexure links from being stretched or broken by sudden shock.

The mounting of the flexure links to link support 26 and to mirror 1 is best described by referring to Fig. 3 in which one flexure link suspension is shown, the mounting of both flexure links being identical except as otherwise indicated. Flexure link 32 has upper and lower mounting openings transverse to its thickness dimension. The upper opening is used to attach the flexure link to the link support by means of a link support-flexure link mount comprising mating male and female clamps 33 and 34. Male clamp 33 has an extension 35 adapted to mate with the upper opening in the flexure link. Female clamp 34 has a depression therein adapted to mate with extension 35. Each clamp is attached to an unrestrained end portion of the link support by means of bolts 36 and they are clamped together against the intervening flexure link by bolt 38. Link support 26 is forked to form groove 37 through which the flexure link passes.

The flexure links are mounted to mirror 1 in a similar manner. Each flexure link passes from the link support positioned outside the mirror compartment into the mirror compartment through an opening 39 (Fig. 1) in the annulus. Referring again to Fig. 3, flexure link 32 passes into the mirror through a longitudinal slot 40. A second slot 41 having counterbores at either end passes through the mirror and extends transverse to and intersecting slot 40. The flexure link is attached to the mirror by means of a mirror-flexure link mount comprising mating male and female inserts 42 and 43 fitted within slot 41 and positioned one to either side of the flexure link. Male insert 42 has an extension 44 adapted to mate with the lower opening in the flexure link. Female insert 43 has a depression therein adapted to mate with extension 44. The flexure link is pressed tightly between the two inserts by means of bolt 45. Insert 43 is held in place by cap 46 pressed tightly against spring washer 47 by bolt 48.

Mirror 1 is in the form of a circular disk having two equal concentric opposing parallel flat surfaces 50 and 51. Both of these surfaces are light-reflecting. In this embodiment the mirror is made of plate glass having a coating of at least 85% reflectance applied to the surfaces which are accurately polished to insure flatness and parallelism.

The mirror is symmetrical about a first plane located centrally between its reflecting surfaces. In order that the reflecting surfaces define vertical planes in equilibrium the mirror is suspended from points defined by inserts 42 and 43 located in this first plane of symmetry. Referring to Figs. 2 and 3, the link support suspension points defined by clamps 33 and 34 are located in reference plane A—A which passes centrally between windows 21 and is vertical since the housing is considered to be leveled. The mirror suspension points therefore fall in plane A—A, plane A—A coincides with the mirror's first plane of symmetry, and the mirror's parallel reflecting surfaces fall parallel to and equidistant from the inner surfaces of the windows.

The mirror is also symmetrically constructed about a second plane perpendicular to the mirror's concentric reflecting surfaces and containing the line joining their centers. The mirror's suspension points are located in a line perpendicular to this second plane of symmetry and are positioned to either side of this second plane equidistant therefrom.

In Fig. 1 a plane B—B perpendicular to base plate 3 and containing line C—C the axis of annulus 16 is used as a reference. Plane B—B is also vertical since the housing is considered to be leveled. The link support suspension points are located equidistant from either side of plane B—B in a line perpendicular to plane B—B. The flexure links 32 are equal in length and the mirror suspends therefrom so that its second plane of symmetry coincides with plane B—B. The spacing between link support and mirror suspension points is equal so that the flexure links fall parallel to one another. The length of the flexure links is such that the mirror's center line coincides with axis C—C.

Evidently vertical mirror suspension and accurate mirror placement within the mirror compartment require precise positioning of the flexure link suspension points relative to the mirror and mirror compartment. The described housing can be easily and accurately machined affording an accurately dimensioned mirror compartment and precise link support placement relative thereto. The housing is also economical, sturdy and rugged. The described mounts, both clamp and insert, can also be accurately machined and accurately position the critical suspension points. They also provide sturdy yet free-swinging flexure link support, thereby retaining the sensitivity of flexure link suspension.

It will be noted in Fig. 4 that the mating male and female inserts of one mirror-flexure link mount are positioned in reverse relationship with respect to the mating inserts of the other mirror-flexure link mount. This arrangement balances out any forces tending to affect the vertical alignment of the mirror caused by unequal thermal expansion of the mirror-flexure link mounts due to the physical difference between the male and female mating inserts.

A bore 52 extends through the mirror perpendicular to its reflecting surfaces and is positioned in the mirror's lower portion bisected by plane B—B. Internally threaded sleeve 53 is inserted within the bore. Externally threaded balance weight 54 mates with sleeve 53, thereby permitting adjustable positioning within the sleeve. Opening 55 in window 21 permits the entry of a tool into the mirror compartment to adjust the position of the balance weight. Plug 56 is inserted into the opening to prevent air currents from disturbing the mirror during operation.

Variation of the position of the balance weight will vary the position of the combined center of gravity of the mirror and weight with respect to the morror's suspension points. The position of the balance weight may therefore be adjusted to compensate for any departure by the mirror's reflecting surfaces from the vertical which might result from a variety of chronic or transient conditions.

V-slot 57 is bisected by plane B—B, extends perpendicularly between the reflecting surfaces of the mirror, and opens downwardly to face locking pin 11 of locking bolt 10. The locking bolt may be adjusted so that pin 11 is brought into contact with the sides of the V-slot. This arrangement is used as locking means to hold the mirror in place when it is not in use, thereby protecting it and the sensitive flexure links.

Flexure link suspension serves a dual purpose in that in addition to its excellent vertical seeking sensitivity the flexible suspension tends to isolate the suspended mirror from any vibrations transmitted to the housing. Additional protection from the effects of vibration on the suspended mirror is provided by damping means.

With the housing accurately leveled and the mirror in its equilibrium position the mirror's reflecting surfaces define vertical planes and fall parallel to the windows in the mirror compartment. Vibration damping is effected by dimensioning the mirror compartment so that the windows are positioned closely adjacent to the mirror's reflecting surfaces. The windows then act as damping plates forming thin cushions of air opposite the mirror's reflecting surfaces which oppose vibrating forces transmitted to the mirror.

The smaller the dimension separating the mirror from the damping plates the more effective the damping. The separation is of course limited by the range of mirror swing required to compensate for the inaccuracy of the housing bubble leveling. Other factors which might require further increases in mirror-damping plate separation are housing and suspension inaccuracies since such inaccuracies might result in skewing of the mirror and damping plates relative to one another.

The described housing construction including the mirror compartment and link support placement, and the described mirror suspension means provide accurate and parallel placement of the mirror within the mirror compartment. With these construction techniques vertical leveling mirrors have been built in which the mirror-damping plate separation is .006″. Advantageously the mirror-damping plate spacings to either side of the mirror are made equal in order to provide balanced damping forces.

It will be noted that the mirror is completely enclosed in a closely fitted mirror compartment so that most of the mirror suspension means is located outside of the mirror compartment and openings must be provided therein for the insertion of the flexure links. In the vertical leveling mirror embodiment being described the separation between the circular extension 20 of the mirror compartment and the circular surface of the disk-shaped mirror is approximately .014″. Placing the mirror in a closely fitted enclosure aids the effectiveness of the vibration damping.

The operation of the mirror may be hampered by static charges which accumulate on the surfaces of the mirror and housing. Static charges bring about forces which may shift the mirror from the vertical or even cause the mirror to "stick" to the windows. These charges are effectively eliminated by the application of a coat of conductive material to the surfaces of the mirror and housing and by the electrical interconnection of the coats to a common conductive or ground point. It has been found that best results are obtained if the total mirror surface and total mirror compartment surface are coated. The coating applied to the windows must of course be transparent.

The accuracy of line of sight level measurement is materially increased by the provision of two parallel, flat, light-reflecting surfaces on opposite sides of the suspended mirror. Measurement of the level of the line of sight can then be effected by first aligning incident and reflected rays with one reflecting surface as the reference and then checking the alignment with the other reflecting surface as the reference. Any departure from alignment in the second measurement must be due to tilt of the parallel reflecting surfaces with respect to the vertical and can be compensated for by halving the error in each alignment reading.

The provision of two parallel reflecting surfaces on opposite sides of the mirror also facilitates adjustment of the equilibrium position of the mirror by means of the described balance weight. A first telescope reading is taken with respect to one reflecting surface, the telescope being adjusted until the incident and reflected rays are aligned. A second reading is then taken with respect to the other reflecting surface. The mirror is then vertically positioned by adjusting the position of the balance weight so that any departure from alignment indicated by the second reading is halved.

Unless otherwise indicated description of the present invention in the preceding specification and in the appended claims are made with the housing in its leveled position and the mirror in its equilibrium position.

A preferred embodiment of the invention has been described. Various changes and modifications however may be made within the scope of the invention as set forth in the appended claims.

We claim:

1. A vertical leveling mirror comprising an annulus having an internal circular extension which forms a pair of spaced parallel vertical shoulders, a pair of flat transparent damping plates fitted into said annulus against said shoulders thereby forming a disk-shaped mirror compartment, a disk-shaped mirror with opposing parallel flat light-reflecting surfaces, said mirror being suspended in said mirror compartment so that its light-reflecting surfaces define vertical planes in its equilibrium position and fall parallel to said damping plates, said mirror compartment being closely fitted about said mirror, to provide a thin air cushion to either side of said mirror surfaces for vibration damping, mirror suspension means comprising a link support placement positioned outside said mirror compartment, a link support comprising a strip of spring material attached to said link support placement so as to have unrestrained end portions extending to either side of said placement, a pair of vibration isolating flexure links for suspending said mirror from said link support, each of said flexure links having an upper and lower opening therein, a pair of spaced link support-flexure link mounts attached one to an unrestrained link support end portion, each link support-flexure link mount comprising a male clamp which mates with the upper opening of the associated flexure link and a mating female clamp which clamps said flexure link therebetween, openings in said mirror compartment through which said flexure links are inserted, and a pair of spaced mirror-flexure link mounts, each mirror-flexure link mount comprising a first slot extending longitudinally into said mirror through which the associated flexure link is inserted, a second mirror slot transverse to and intersecting said first slot, a mating male and female insert fitted within said second slot, said male insert being mated with the lower opening in said associated flexure link, and said female insert being mated with said male insert and clamped against said associated flexure link positioned therebetween, the male and female inserts of each of said mirror-flexure link mounts being positioned in reverse relationship with respect to the inserts of the other mirror-flexure link mount, an adjustably positioned balance weight attached to said mirror for vertically aligning the mirror's light-reflecting surfaces, and conductive coatings applied to the total mirror surface and the total mirror compartment surface, said conductive coatings being electrically interconnected.

2. A vertical leveling mirror comprising a pair of opposing spaced flat vertical and parallel damping plates, a mirror with opposing parallel flat surfaces at least one of which is light-reflecting, said mirror being suspended between said damping plates so that its opposing surfaces define vertical planes in its equilibrium position and fall parallel to said damping plates, said damping plates being positioned closely adjacent to said mirror surfaces, to provide a thin air cushion to either side of said mirror surfaces for vibration damping, mirror suspension means comprising a support, a pair of vibration isolating flexure links for suspending said mirror from said support, each of said flexure links having an upper and lower opening therein, a pair of spaced support-flexure link mounts attached to said support, each support-flexure link mount comprising a male clamp which mates with the upper opening of the associated flexure link and a mating female clamp which clamps said flexure link therebetween, and a pair of spaced mirror-flexure link mounts, each mirror-flexure link mount comprising a first slot extending longitudinally into said mirror through which the associated flexure link is inserted, a second mirror slot transverse to and intersecting said first slot, a mating male and female insert fitted within said second slot, said male insert being mated with the lower opening in said associated flexure link, and said female insert being mated with said male insert and clamped against said associated flexure link positioned therebetween, the male and female inserts of each of said mirror-flexure link mounts being positioned in reverse relationship with respect to the inserts of the other mirror-flexure link mount.

3. A vertical leveling mirror in accordance with claim 2 in which an adjustably positioned balance weight is attached to the mirror for vertically aligning the mirror's light-reflecting surface.

4. A vertical leveling mirror in accordance with claim 2 in which the damping plates form part of a mirror compartment closely fitted about the suspended mirror, said compartment having openings therein for the insertion of the flexure links.

5. A vertical leveling mirror comprising a support, a pair of opposing spaced flat vertical and parallel damping plates fixed with respect to said support, a mirror with opposing parallel flat surfaces at least one of which is light-reflecting, at least the damping plate which opposes said light-reflecting surface having a transparent portion, a vibration isolating flexure link suspending said mirror vertically from said support, said support and flexure link suspending the mirror between said damping plates with its opposing surfaces defining vertical planes in its equilibrium position and falling parallel to said damping plates, said damping plates being positioned closely adjacent to said mirror surfaces to provide a thin air cushion to either side of said mirror surfaces for vibration damping.

6. A vertical leveling mirror in accordance with claim 5 in which transparent conductive coatings are applied to the mirror surfaces and the damping plates, said conductive coatings being electrically interconnected.

7. A vertical leveling mirror in accordance with claim 5 in which an adjustably positioned balance weight is attached to the mirror for vertically aligning the mirror's opposing surfaces.

8. A vertical leveling mirror in accordance with claim 5 enclosed within a housing.

9. A vertical leveling mirror in accordance with claim 5 in which both of the opposing mirror surfaces are light-reflecting and at least a portion of both said damping plates are transparent.

10. A vertical leveling mirror comprising a mirror compartment incorporating a pair of opposing spaced flat vertical and parallel damping plates, a mirror with opposing parallel flat surfaces at least one of which is light-reflecting, at least the damping plate which opposes said light-reflecting surface being transparent, mirror suspension means vertically suspending said mirror in said mirror compartment and comprising a support positioned outside said mirror compartment, a vibration isolating flexure link suspending said mirror from said support, said mirror compartment having an opening through which said flexure link is inserted, said support and flexure link suspending said mirror between said damping plates with its opposing surfaces defining vertical planes in its equilibrium position and falling parallel to said damping plates, said mirror compartment being closely fitted about said mirror to provide a thin air cushion to either side of said mirror surfaces for vibration damping.

11. A vertical leveling mirror in accordance with claim 10 in which transparent conductive coatings are applied to the total mirror surface and conductive coatings are applied to the total mirror compartment surface, said conductive coatings being electrically interconnected.

12. A vertical leveling mirror in accordance with claim 10 in which transparent conductive coatings are applied to the total mirror surface and conductive coatings are applied to the total mirror compartment surface, said conductive coatings being electrically interconnected, and an adjustably positioned balance weight is attached to the mirror for vertically aligning the mirror's opposing surfaces.

13. A vertical leveling mirror in accordance with claim 10 in which the mirror and mirror compartment are disk shaped.

14. A vertical leveling mirror comprising a support, a mirror with a flat light-reflecting surface, and means for suspending said mirror from said support so that its light-reflecting surface defines a vertical plane in its equilibrium position, said means comprising a vibration isolating flexure link of thin sheet material attached to said support and suspended therefrom, and a mirror flexure-link mount comprising a first slot extending longitudinally into said mirror through which said flexure link is inserted, a second mirror slot transverse to and intersecting said first slot, and a mating male and female insert fitted within said second slot, said male insert having a shoulder forming extension fitted through an opening in said flexure link, said female insert being mated with said extension, and means for clamping said female and male inserts against said flexure link therebetween.

15. A vertical leveling mirror in accordance with claim 14 in which the mirror is suspended from the support by a pair of spaced flexure links, said mirror being provided with a pair of spaced mirror flexure-link mounts, the male and female inserts of each of said mirror flexure-link mounts being positioned in reverse relationship with respect to the inserts of the other mirror flexure-link mount.

References Cited in the file of this patent

UNITED STATES PATENTS

| | | |
|---|---|---|
| 1,085,612 | Jacob | Feb. 3, 1914 |
| 1,689,624 | Eskilson et al. | Oct. 30, 1928 |
| 2,346,483 | Goss | Apr. 11, 1944 |
| 2,407,416 | Gudmundson | Sept. 10, 1946 |
| 2,429,420 | McMaster | Oct. 21, 1947 |
| 2,679,181 | Keuffel et al. | May 25, 1954 |
| 2,741,940 | Drodofsky | Apr. 17, 1956 |
| 2,779,231 | Drodofsky | Jan. 29, 1957 |

FOREIGN PATENTS

| | | |
|---|---|---|
| 137,176 | Great Britain | Jan. 8, 1920 |